United States Patent
Hammoud (10) Patent No.: US 7,650,034 B2
(45) Date of Patent: Jan. 19, 2010

(54) METHOD OF LOCATING A HUMAN EYE IN A VIDEO IMAGE

(75) Inventor: Riad I. Hammoud, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 707 days.

(21) Appl. No.: 11/300,621

(22) Filed: Dec. 14, 2005

(65) Prior Publication Data

US 2007/0133884 A1  Jun. 14, 2007

(51) Int. Cl.
*G06K 9/62* (2006.01)
*G06K 9/00* (2006.01)

(52) U.S. Cl. .................. 382/225; 382/117; 382/118

(58) Field of Classification Search .............. 382/117, 382/225, 118
See application file for complete search history.

(56) References Cited

U.S. PATENT DOCUMENTS

| | | | |
|---|---|---|---|
| 5,016,282 A | 5/1991 | Tomono et al. | |
| 5,481,622 A * | 1/1996 | Gerhardt et al. | 382/103 |
| 5,795,306 A | 8/1998 | Shimotani et al. | |
| 5,805,720 A * | 9/1998 | Suenaga et al. | 382/117 |
| 5,818,954 A | 10/1998 | Tomono et al. | |
| RE36,041 E | 1/1999 | Turk et al. | |
| 5,878,156 A * | 3/1999 | Okumura | 382/118 |
| 5,926,251 A | 7/1999 | Okumura | |
| 6,097,295 A | 8/2000 | Griesinger et al. | |
| 6,130,617 A | 10/2000 | Yeo | |
| 6,243,015 B1 | 6/2001 | Yeo | |
| 6,304,187 B1 | 10/2001 | Pirim | |
| 6,381,345 B1 | 4/2002 | Swain | |
| 6,571,002 B1 | 5/2003 | Ogawa | |
| 6,792,134 B2 * | 9/2004 | Chen et al. | 382/117 |
| 7,158,177 B2 * | 1/2007 | Kage et al. | 348/239 |
| 2004/0057013 A1 * | 3/2004 | Cappo et al. | 351/224 |

OTHER PUBLICATIONS

Hansen, Hammoud, Boosting Particle Filter-based Eye Tracker Performance Through Adapted Likelihood Function, IEEE International Conference on Advanced Video and Signal based Surveillance, Sep. 15-16, 2005, pp. 111-116.

* cited by examiner

*Primary Examiner*—Bhavesh M Mehta
*Assistant Examiner*—Michael Vanchy, Jr.
(74) *Attorney, Agent, or Firm*—Jimmy L. Funke (57) ABSTRACT

A human eye is detected in a video image by identifying potential eye candidates using horizontal and vertical projection filtering on a specified portion of the image, coupled with rudimentary appearance-based testing. The identified eye candidates are clustered and winning eye candidates are selected based on appearance, spatial-geometric and anthropomorphic considerations. The winning eye candidates are subjected to additional appearance-based testing, and high confidence eye candidates are accepted if they favorably compare with identified eye candidates from previous video image frames.

4 Claims, 13 Drawing Sheets

METHOD OF LOCATING A HUMAN EYE IN A VIDEO IMAGE

TECHNICAL FIELD

The present invention relates to a method for locating a human's eyes in a video image with multiple sequentially applied filtering techniques.

BACKGROUND OF THE INVENTION

Vision systems frequently entail detecting and tracking a subject's eyes in an image generated by a video camera. In the motor vehicle environment, for example, a camera can be used to generate an image of the driver's face, and portions of the image corresponding to the driver's eyes can be analyzed to assess drive gaze or drowsiness. See, for example, the U.S. Pat. Nos. 5,795,306; 5,878,156; 5,926,251; 6,097,295; 6,130,617; 6,243,015; 6,304,187; and 6,571,002, incorporated herein by reference.

While eye detection and tracking algorithms can work reasonably well in a controlled environment, they tend to perform poorly under real world imaging conditions where the lighting produces shadows and the subject's eyes can be occluded by eyeglasses, sunglasses or makeup. As a result, pixel clusters associated with the eyes tend to be grouped together with non-eye features and discarded when subjected to appearance-based testing. This problem occurs both in eye-detection routines that initially identify the subject's eyes, and in eye-tracking routines that track the eye location from one image frame to the next. Another problem concerns limitations on the processing throughput of the vision system as the detection and tracking routines increase in complexity. Accordingly, what is needed is an efficiently executed method of a processing a video image for reliably locating a subject's eyes under various lighting and occlusion conditions.

SUMMARY OF THE INVENTION

The present invention is directed to an efficient and reliable method of detecting a human eye in a video image. Potential eye candidates are identified using horizontal and vertical projection filtering on a specified portion of the image, coupled with rudimentary appearance-based testing. The identified eye candidates are clustered and winning eye candidates are selected based on appearance, spatial-geometric and anthropomorphic considerations. The winning eye candidates are subjected to additional appearance-based testing, and high confidence eye candidates are accepted if they favorably compare with identified eye candidates from previous video image frames.

DESCRIPTION OF THE PREFERRED EMBODIMENT

The method of the present invention is disclosed in the context of a system that monitors a driver of a motor vehicle. However, it will be recognized that the method of this invention is equally applicable to other vision systems that detect and track eye movement, whether vehicular or non-vehicular.

Figure 1:
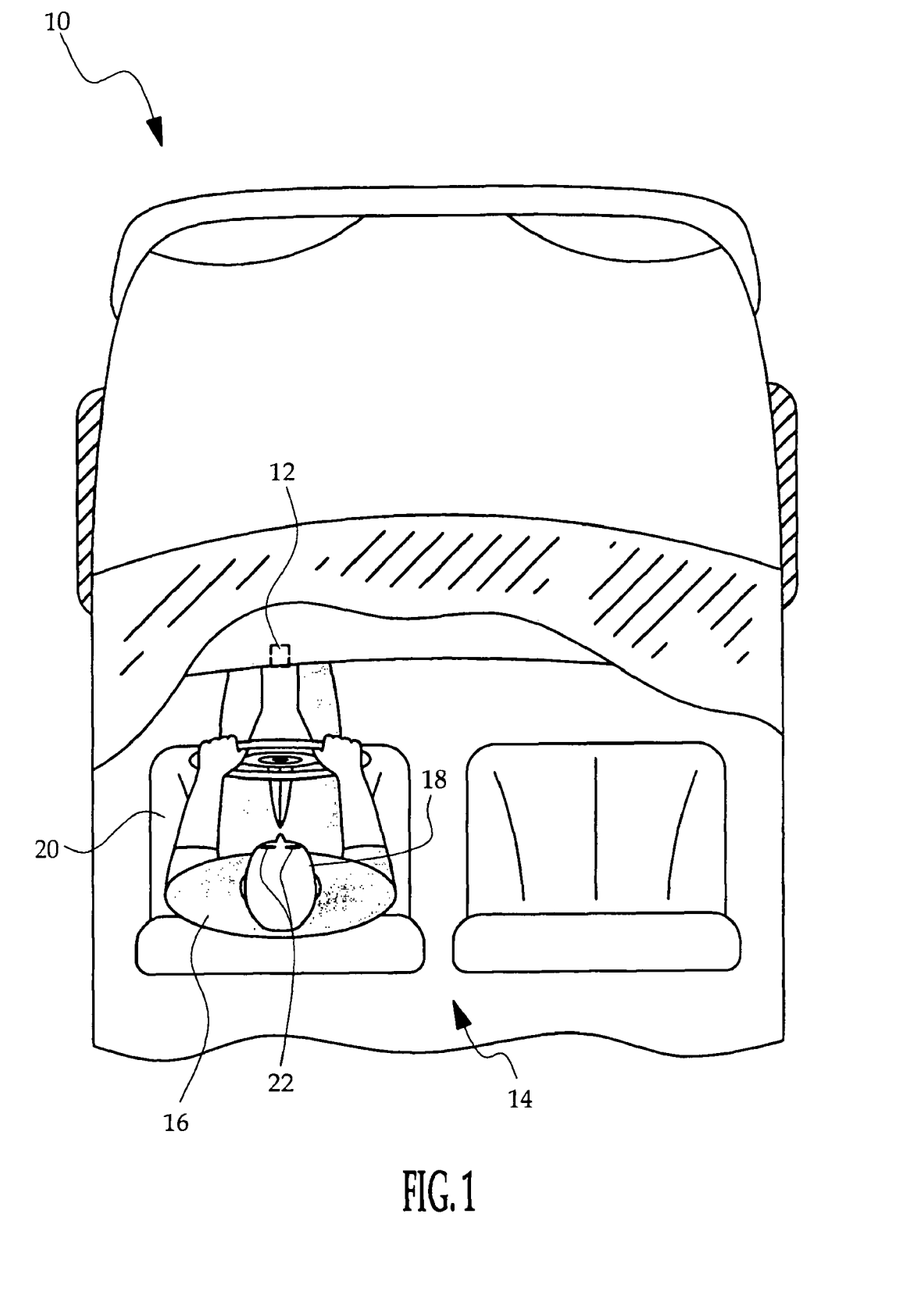
FIG. 1 depicts a diagram of a vehicle equipped with an eye monitoring apparatus based on the present invention.

Referring to the drawings, and particularly to FIG. 1, the reference numeral 10 generally designates a motor vehicle equipped with an eye monitoring apparatus 12 according to the present invention. In the illustration of FIG. 1, the apparatus 12 is mounted in the passenger compartment 14 forward of the driver 16 in a location that affords an unobstructed view of the driver's face 18 when the driver 16 is reposed on the seat 20, taking into account differences in driver height and orientation. In general, the eye monitoring apparatus 12 produces a series of video images of the driver's face 18, and executes digital signal processing routines for detecting portions of a given image that correspond to the driver's eyes 22 and tracking the eye location between successively produced video images. The state of the eyes 22 can be characterized for various purposes such as detecting driver drowsiness and/or distraction, or even driver gaze.

Figure 2:
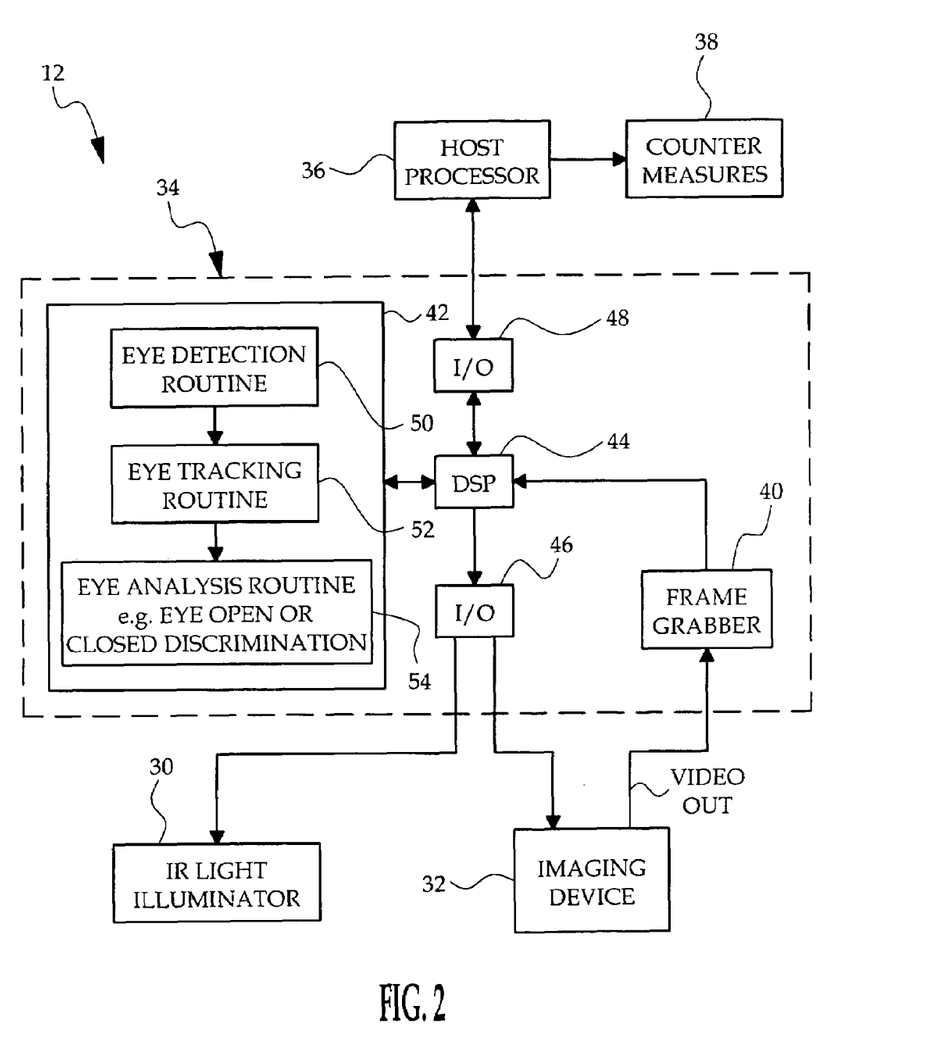
FIG. 2 depicts a block diagram of the eye monitoring apparatus of FIG. 1, including an imaging device and a microprocessor-based digital signal processor (DSP) for carrying out an eye detection method according to the present invention.

Referring to the block diagram of FIG. 2, the apparatus 12 includes an infrared (IR) light illumination device 30, a solid-state imaging device 32 and a vision processor 34. In the illustrated embodiment, the apparatus 12 provides eye state information to a remote host processor 36 via line 37, and the host processor 36 selectively activates one or more countermeasure devices or systems 38 such as an alarm or a braking system if it is determined that the driver's lack of alertness or attention may possibly compromise vehicle safety. The illumination device 30 may be an array of light emitting diodes, for example, and the imaging device 32 may be a CCD or CMOS imaging chip. The vision processor 34 comprises conventional components, including a frame grabber 40 for acquiring video images from imaging device 32, a non-volatile memory 42 for storing various signal processing routines, and a digital signal processor (DSP) 44 for selectively executing the routines stored in memory 42 processing the video images acquired by frame grabber 40. The DSP 44 outputs various control signals to illumination device 30 and imaging device 32 via interface 46, and communicates with host processor 37 via interface 48.

The signal processing routines residing in the vision processor memory 42 include an eye detection routine 50, an eye tracking routine 52, and an eye analysis routine 54. In general, the routine 50 identifies the regions of a video image that correspond to the driver's eyes 22, the routine 52 tracks the eye location from one video image to the next, and the routine 54 characterizes the state of the driver's eyes (open vs. closed, for example). The present invention primarily concerns the eye detection routine 50; the eye tracking routine 52, the analysis routine 54 and the routines executed by host processor 36 for using the eye state information may comprise any of a number of known processing techniques.

The eye detection method of the present invention involves the application of various filtering techniques to selected portions of each video image to identify potential eye candidates and then subjecting the eye candidates to various tests to discern eyes from extraneous non-eye features. Flow diagrams are used to represent software routines executed by DSP 44 in carrying out the method.

Figure 7:
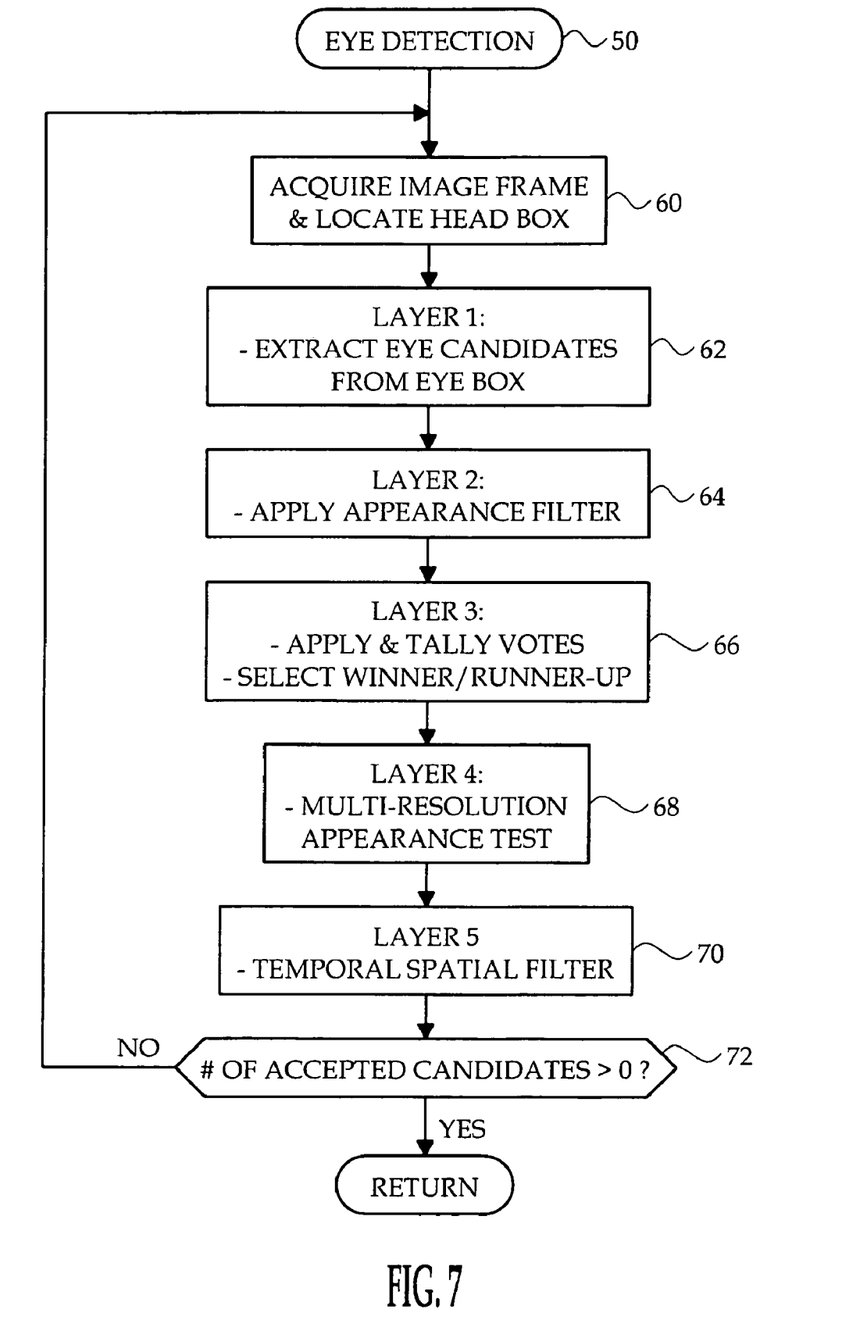
FIG. 7 is a main flow diagram of an eye detection routine executed by the DSP of FIG. 2 according to this invention.

The eye detection routine 50 is depicted by the flow diagrams of FIGS. 7-15, and is illustrated in part by the images of FIGS. 3-6. Referring to FIG. 7, the detection process starts by executing block 60 to acquire a video image frame from imaging device 32 and locate a subset of the image that includes the occupant's head; this subset is referred to herein as the head box, and comprises a predefined number of pixels. An example of a typical head box image is depicted by the gray-scale image of FIG. 3. The blocks 62-70 are then sequentially executed to analyze the head box located by block 60 for the purpose of identifying regions within the head box that correspond to the occupant's eyes; the identified eye regions are referred to herein as potential eye candidates, and also comprise a predefined number of pixels. In the gray-scale head-box image of FIG. 6, the perimeters of the potential eye candidates are depicted by solid black lines. The block 72 determines if one or more potential eye candidate has been identified by the processing steps of blocks 62-70. If not, block 60 is executed to acquire another video image and the process is repeated. When at least one potential eye candidate is identified, block 72 is answered in the affirmative, and the eye detection routine 50 is exited.

In the illustrated embodiment, the process of detecting eye candidates involves five sequentially performed processing steps or layers corresponding respectively to the blocks 62, 64, 66, 68 and 70. The first processing layer of block 62 extracts potential eye candidates from the head-box; this process is detailed in the flow diagram of FIG. 8. The second processing layer of block 64 clusters closely spaced potential eye candidates identified by the first processing layer; this process is detailed in the flow diagram of FIG. 9. The clustered eye candidates are then subjected to the third processing layer of block 66. This processing layer, detailed in the flow diagrams of FIG. 10-13, assigns votes to eye candidates based on how well they satisfy skin-based, spatial-geometric-based and anthropomorphic-based filters, and selects up to two candidates with the highest number of votes. The eye candidate(s) selected by block 66 are subjected to the fourth processing layer of block 68, which carries out a multi-resolution appearance-based test, detailed by the flow diagram of FIG. 14. Finally, any eye candidate satisfying the multi-resolution appearance-based filter of block 66 is subjected to the fifth processing layer of block 70. This processing layer, detailed in the flow diagrams of FIGS. 15-16, carries out a temporal spatial filtering technique that assesses frame-to-frame fidelity of the eye candidate to determine if it should be accepted or rejected.

Figure 3:
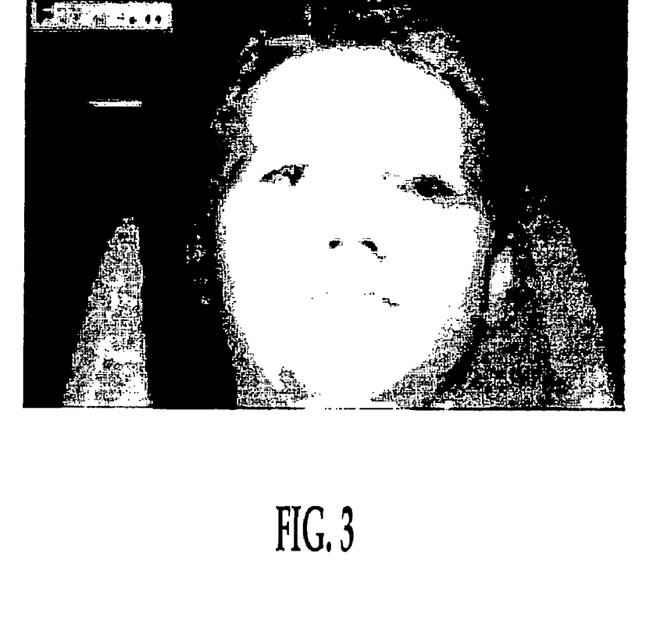
FIG. 3 depicts the head-box portion of a gray-scale video image of a vehicle occupant obtained by the imaging device of FIG. 2.
Figure 4:
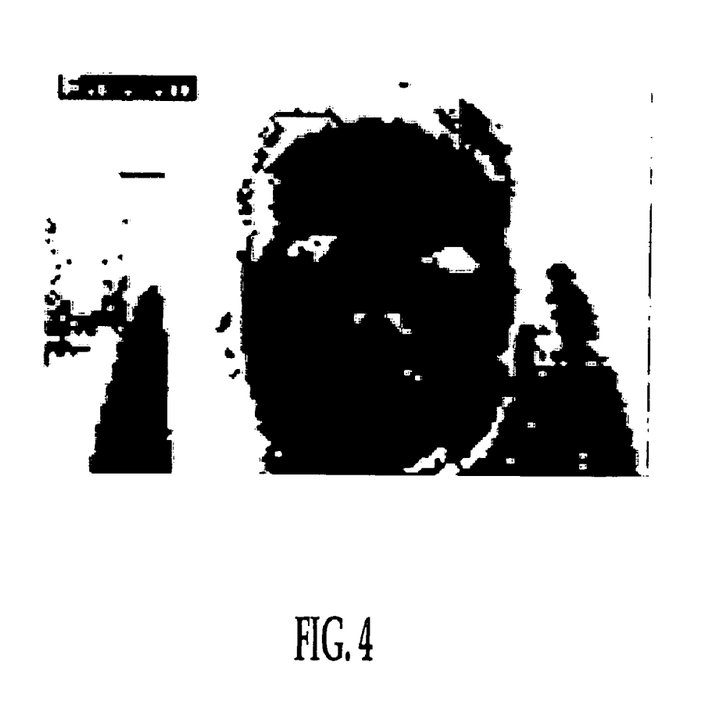
FIG. 4 depicts a filtered and binarized "white image" version of the gray-scale image of FIG. 3, where dark pixels of the un-binarized image are considered as foreground.
Figure 8:
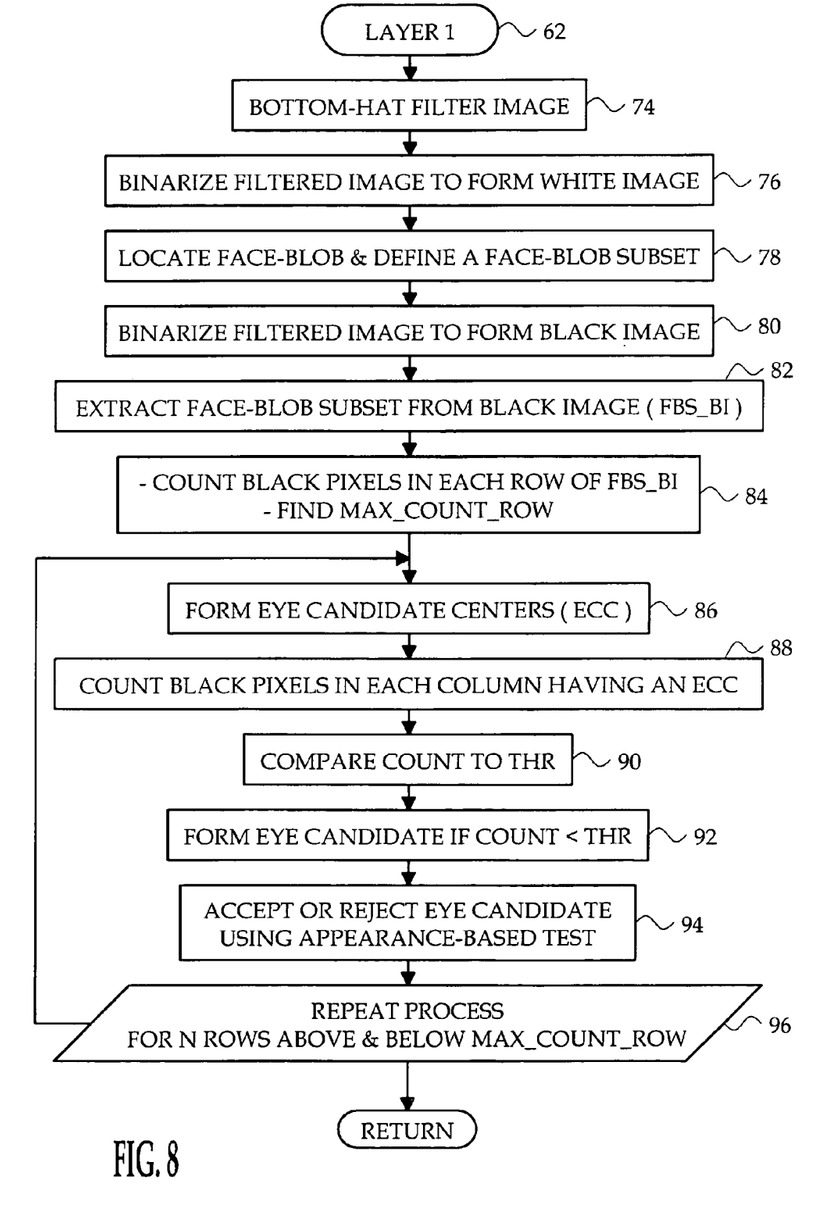
FIG. 8 is a flow diagram detailing a portion of the main flow diagram of FIG. 7 pertaining to extraction of potential eye candidates.

Referring to FIG. 8, and specifically to flow diagram blocks 74-76, the process of extracting potential eye candidates from the head-box of an acquired image frame begins by applying a morphological bottom-hat filter to the head-box and binarizing the filtered image. The bottom-hat filter is implemented with a mask of predefined size, and generally serves to suppress extraneous pixel information and emphasize the edges of objects and other definable features and regions within the head box. The filtered image is initially binarized to form a "white image"—i.e, an image in which the dark pixels of the filtered image are represented by white pixels, and light pixels of the filtered image are represented by black pixels. FIG. 4 depicts a "white image" version of the image of FIG. 3. Referring to FIG. 4, the occupant's facial skin and other highly reflective regions are represented by black pixels, while dark regions including the occupant's eyes and nostrils are represented by white pixels.

The block 78 scans the "white image" developed at block 76 to identify a "face-blob" of pixels and to isolate a subset of the face-blob that is most likely to include the occupant's eyes. The "face blob" is identified as the largest region of contiguous black pixels. The face-blob is bounded with a rectangular window, and predetermined top and bottom portions of the pixels within the window are removed to isolate the desired subset of the face-blob. The image filtered at block 74 is then binarized at block 80 to form a "black image" which is the opposite of the "white image" depicted in FIG. 4. In other words, dark pixels of the filtered image (i.e., the occupant's eyes and nostrils) are represented by black pixels in the black image, and light pixels of the filtered image (i.e., the occupant's facial skin) are represented by white pixels. The block 82 extracts a portion of the binarized black-image (FB-S_BI) corresponding to the face-blob subset identified at block 78. A "black-image" face-blob subset based on the images of FIGS. 3-4 is depicted in the upper left-hand corner of FIG. 5.

Figure 5:
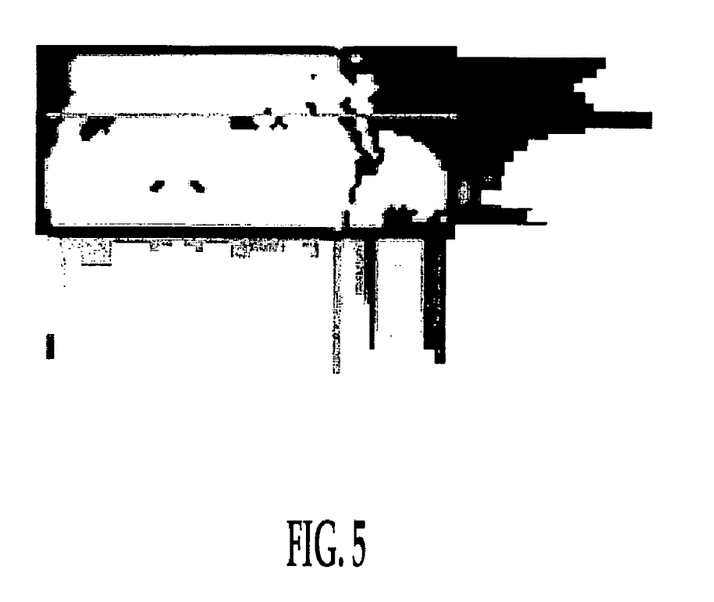
FIG. 5 depicts the eye-box portion of a filtered and binarized "dark image" version of the gray-scale image of FIG. 3, where light pixels of the un-binarized image are considered as foreground, along with horizontal and vertical histogram data developed according to this invention.
Figure 6:
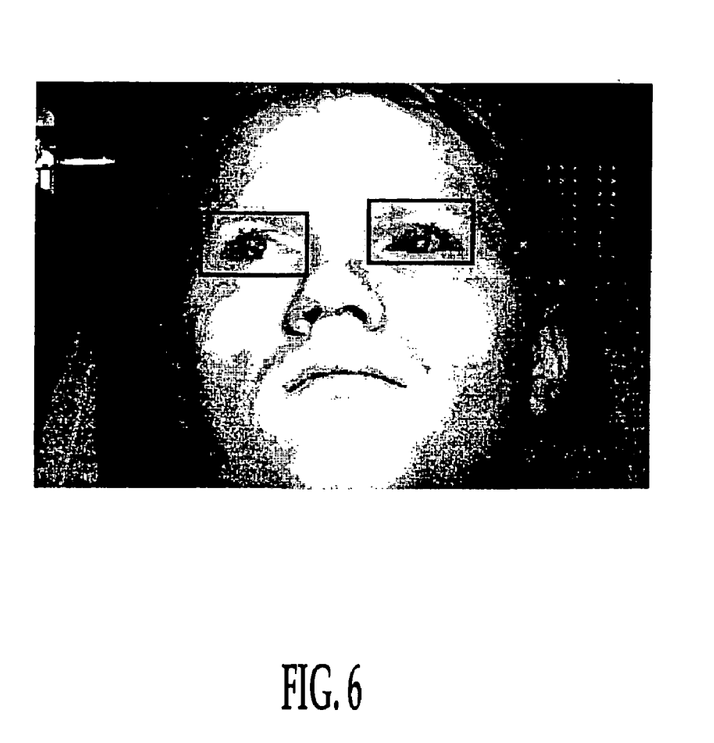
FIG. 6 depicts a gray-scale image of a vehicle occupant obtained by the imaging device of FIG. 2, with detected eye box portions of the image identified by rectangular boxes.

Once the "black-image" face-blob subset has been formed, block 84 is executed to count the number of black (receptive hole) pixels in each horizontal line or row of the image. In FIG. 5, the pixel counts are represented by the histogram to the right of the face-blob subset image. Since the occupant's eyes are usually horizontally aligned in the image, the highest pixel count will generally occur in the pixel rows that correspond to the occupant's eyes, as is the case in the example of FIG. 5. Block 84 identifies the pixel row having the highest receptive hole content (MAX_COUNT_ROW) and block 86 identifies each black pixel in that row as an eye candidate center.

The block 88 counts the number of black pixels in each vertical line or column containing an eye candidate center. In FIG. 5, the pixel counts for each such column are represented by the histogram below the face-blob subset image. The block 90 compares the column pixel counts to a threshold THR. As indicated in the vertical histogram, pixel columns corresponding to the background surrounding the occupant's face have a much higher black pixel frequency than the pixel columns corresponding to the occupant's eyes. The threshold THR is selected to filter out such background-related high frequency columns. Block 92 forms a potential eye candidate for each column having a frequency less than THR by extracting an eye-sized patch of the gray-scale image centered on the respective eye candidate center.

Block 94 performs an appearance-based test (eye vs. non-eye) on each of the potential eye candidates formed at block 92 and eliminates all candidates that are deemed to be non-eye. The appearance-based test utilizes an Eigen analysis in which Eigen-space distances between a respective potential eye candidate and relatively low resolution (Level-I) eye and non-eye models are computed. An eye candidate that resembles the LEVEL-I eye model will have a relatively short eye distance and a relatively long non-eye distance; an eye candidate that resembles the Level-I non-eye model will have a relatively short non-eye distance and a relatively long eye distance. The distances are compared to thresholds to classify the eye candidates as DESIRED, UNDESIRED or UNSURE. The DESIRED classification indicates a high confidence determination that an eye candidate is an eye; i.e., that it resembles the Level-I eye mode, and does not resemble the Level-I non-eye model. Conversely, the UNDESIRED classification indicates a high confidence determination that the eye candidate is a non-eye; i.e., that it resembles the Level-I non-eye mode, and does not resemble the Level-I eye model. The UNSURE classification indicates a high confidence determination cannot be made. The confidence metric is based on the separation between the eye distance and the non-eye distance, with larger separation signifying higher confidence in the appearance determination. Only those eye candidates classified as UNSURE or DESIRED are retained; eye candidates classified as UNDESIRED are eliminated from the eye candidate list. The eye distances and classifications of the retained eye candidates are saved for use in the second level clustering process, described below in reference to the flow diagram of FIG. 9, and the fourth level refinement process, described below in reference to the flow diagram of FIG. 14.

As indicated by block 96, the process defined by blocks 86-94 is repeated for a predefined number N of pixel rows above and below MAX_COUNT_ROW. The predefined number N depends on the application, and may be determined based on the available processing time. The end result is a list of potential eye candidates, each comprising an eye-sized patch of the gray-scale image.

Figure 9:
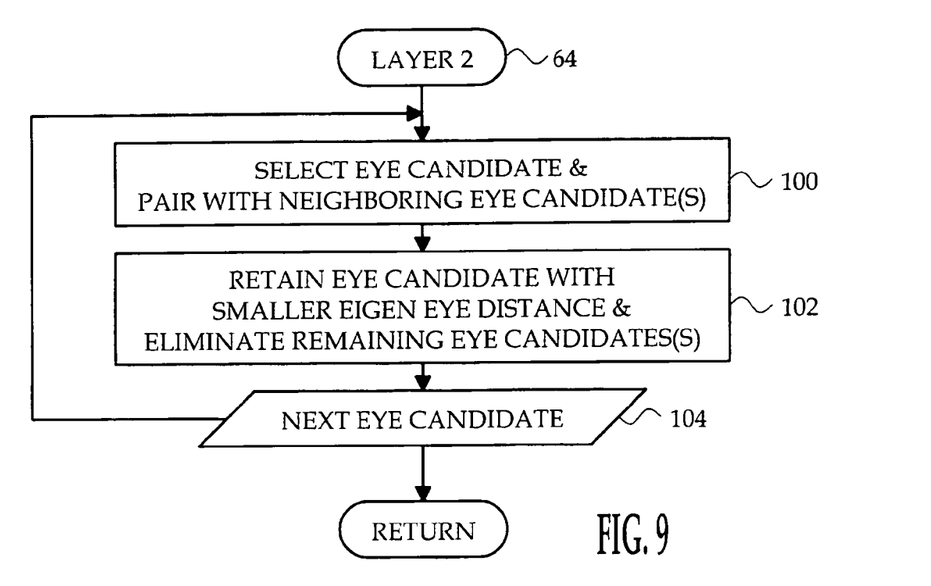
FIG. 9 is a flow diagram detailing a portion of the main flow diagram of FIG. 7 pertaining to application of an appearance-based filter to potential eye candidates extracted by the flow diagram of FIG. 8.
Figure 10:
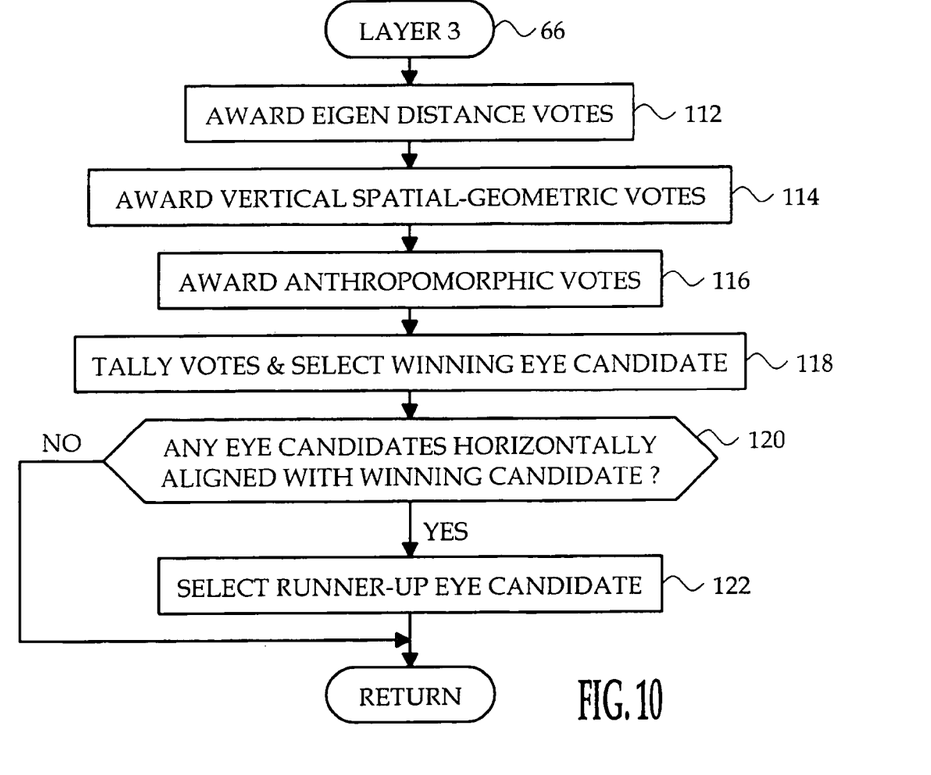
FIG. 10 is a flow diagram detailing a portion of the main flow diagram of FIG. 7 pertaining to selection of up to two eye candidates that satisfy the appearance-based filtering described by FIG. 9 based on how well they satisfy skin-based, spatial-geometric-based and anthropomorphic-based filters.

As indicated above, the third layer of the eye detection process (i.e., block 66 of FIG. 7) clusters closely spaced potential eye candidates identified by the first processing layer. Referring to FIG. 9, the block 100 pairs a selected eye candidate with neighboring eye candidates—i.e., with any eye candidate whose center is within a predetermined coordinate-space distance of the selected eye candidate. If such pairing is possible, the block 102 compares the Eigen eye distances for the respective eye candidates; the eye candidate having the smallest Eigen eye distance is retained, while the other eye candidate(s) is removed from the eye candidate list. As indicated at block 104, the process defined by blocks 100-102 is then repeated for the next eye candidate until every eye candidate in the list has been selected.

The third layer of the eye detection process (i.e., block 66 of FIG. 7) ranks the eye candidates retained by the second processing layer based on how well they satisfy skin-based, spatial-geometric-based and anthropomorphic-based filters, and selects up to two candidates for further processing. Ranking is accomplished by awarding and tallying votes. Referring to the flow diagram of FIG. 10, the block 110 awards votes to the retained eye candidates based on the stored Eigen eye distances. The candidate with the smallest eye distance is awarded two votes, and the eye candidate with the next smallest eye distance is awarded one vote. The block 112 awards votes based on horizontal spatial-geometric considerations, as detailed in the flow diagram of FIG. 11. The block 114 awards votes based on vertical spatial-geometric considerations, as detailed in the flow diagram of FIG. 12. Finally, the block 116 awards votes based on anthropomorphic considerations, as detailed in the flow diagram of FIG. 13. The block 118 tallies the awarded votes and selects a winning eye candidate as the eye candidate having the highest number of votes. Block 120 determines if the list of retained eye candidates includes any other eye candidate(s) that is horizontally aligned with the winning eye candidate. If so, the block 122 identifies that candidate as a runner-up to the winning eye candidate. If there are two or more runner-up eye candidates, the one having the highest number of votes is selected as the runner-up.

Figure 11:
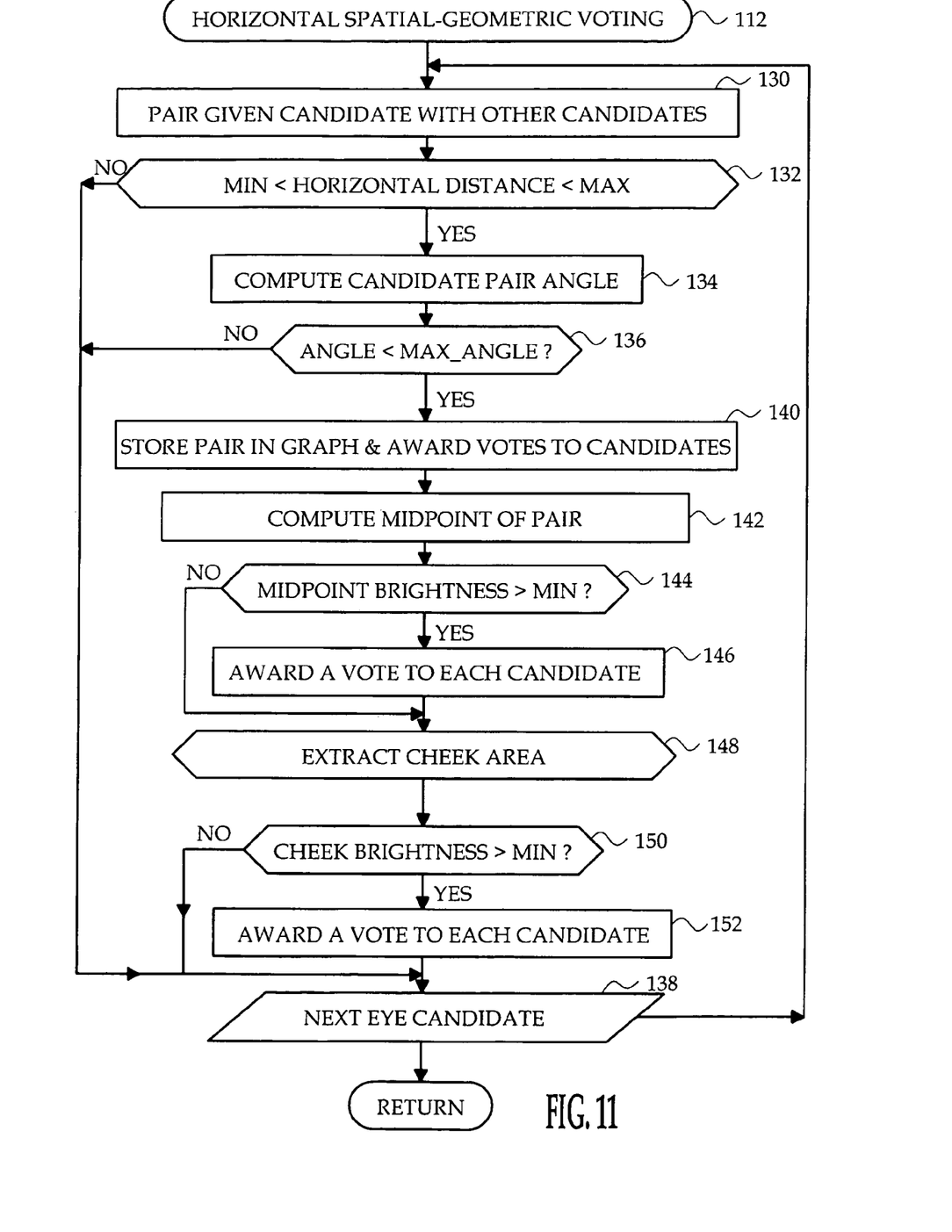
FIG. 11 is a flow diagram detailing a portion of the flow diagram of FIG. 10 pertaining horizontal spatial geometric voting.

Referring to the horizontal spatial-geometric filter routine of FIG. 11, the block 130 selects one of the retained eye candidates from the second processing layer and pairs it with every other retained eye candidate. The block 132 determines if the horizontal distance between any of the paired eye candidates is between minimum (MIN) and maximum (MAX) values. For each candidate pair that satisfies the criteria of block 132, block 134 computes an angle defined by the pair and block 136 determines if the computed angle is less than a calibrated maximum angle (MAX_ANGLE). If the computed angle(s) for a given eye candidate pairing is less than MAX_ANGLE, block 140 stores the pair in a graph and awards one vote to each candidate. The block 142 then extracts a gray-scale patch centered on the midpoint of the stored eye candidate pair; if the paired eye candidates are actually the occupant's eyes, the extracted patch represents the "between eye" region of the occupant's face. Blocks 144-146 award one vote to each candidate of the pair if the brightness of the extracted "between-eye" patch exceeds a minimum brightness (MIN). Next, block 148 extracts a gray-scale patch below a selected one of eye candidates; if the paired eye candidates are actually the occupant's eyes, this extracted patch represents the "cheek" region of the occupant's face. Blocks 150-152 award one vote to each candidate of the pair if the brightness of the extracted "cheek" patch exceeds a minimum brightness (MIN). Finally, block 138 causes the aforementioned process to be repeated with the next retained eye candidate in the list. When the process has been completed for each retained eye candidate in the list, block 138 will be answered in the negative, completing the routine.

Figure 12:
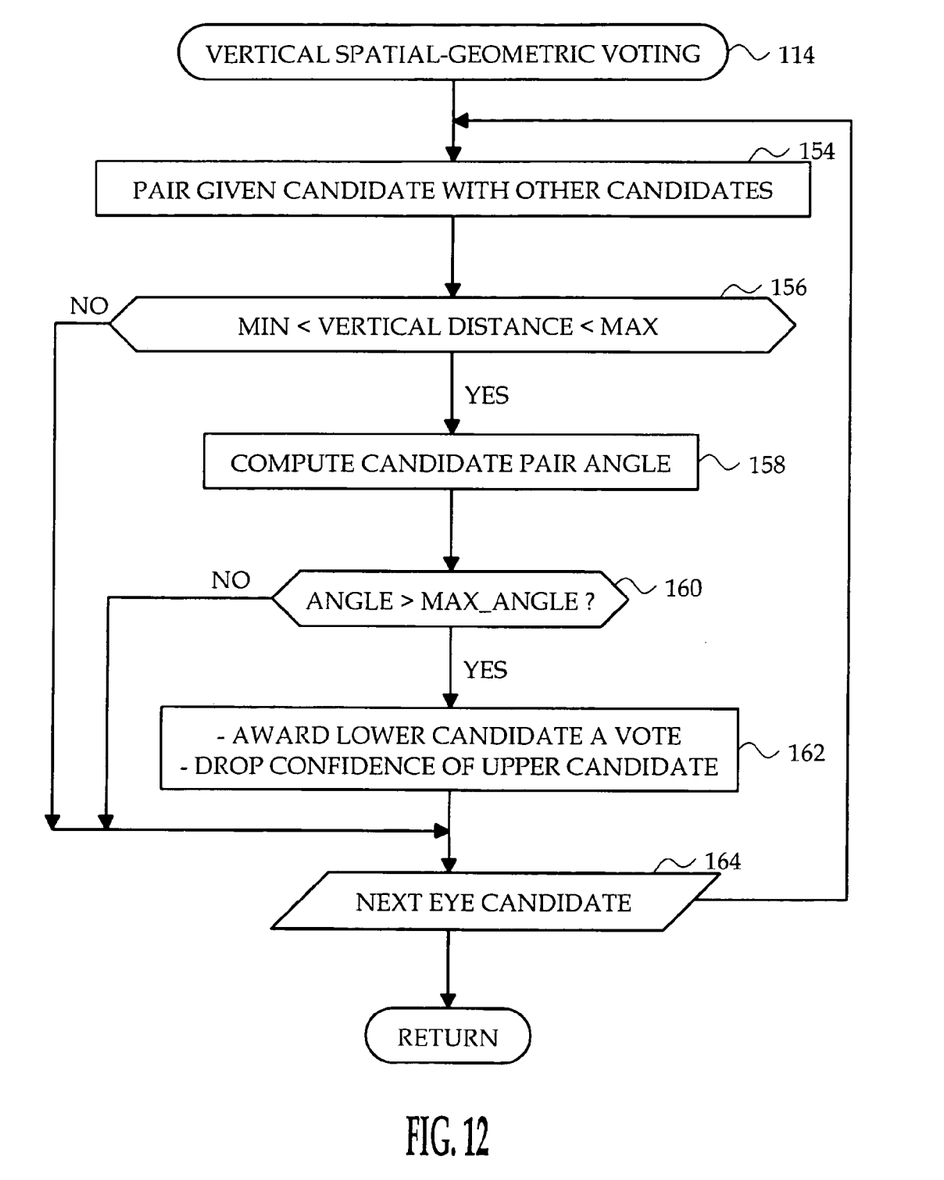
FIG. 12 is a flow diagram detailing a portion of the flow diagram of FIG. 10 pertaining vertical spatial geometric voting.

Referring to the vertical spatial-geometric filter routine of FIG. 12, the block 154 selects one of the retained eye candidates from the second processing layer and pairs it with every other retained eye candidate. The block 156 determines if the vertical distance between any of the paired eye candidates is between minimum (MIN) and maximum (MAX) values. For each candidate pair that satisfies the criteria of block 156, block 158 computes an angle defined by the pair and block 160 determines if the computed angle is greater than a calibrated maximum angle (MAX_ANGLE). If the computed angle(s) for a given eye candidate pairing is greater than MAX_ANGLE, block 162 awards a vote to the lower candidate of the pair and reduces the confidence of the upper candidate of the pair. The block 164 causes the process to be repeated with the next retained eye candidate in the list. When the process has been completed for each retained eye candidate in the list, block 164 will be answered in the negative, completing the routine.

Figure 13:
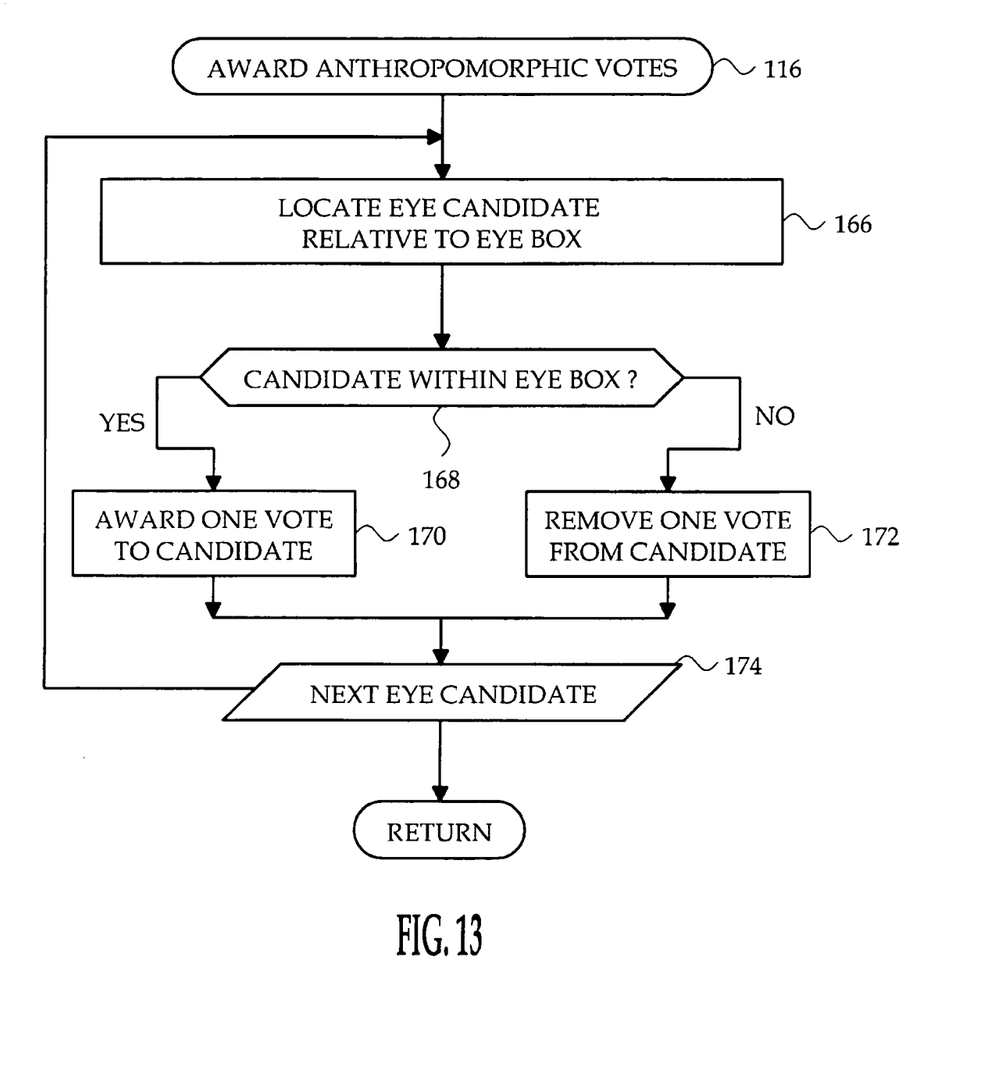
FIG. 13 is a flow diagram detailing a portion of the flow diagram of FIG. 10 pertaining anthropomorphic-based voting.

Referring to the anthropomorphic filter routine of FIG. 13, the blocks 166-168 select one of the retained eye candidates from the second processing layer and determine if it is within the eye-box. If so, block 170 awards one vote to the candidate; if not, block 172 deducts one of the candidate's votes. The block 174 then causes the process to be repeated with the next retained eye candidate in the list. When the process has been completed for each retained eye candidate in the list, block 174 will be answered in the negative, completing the routine.

Figure 14:
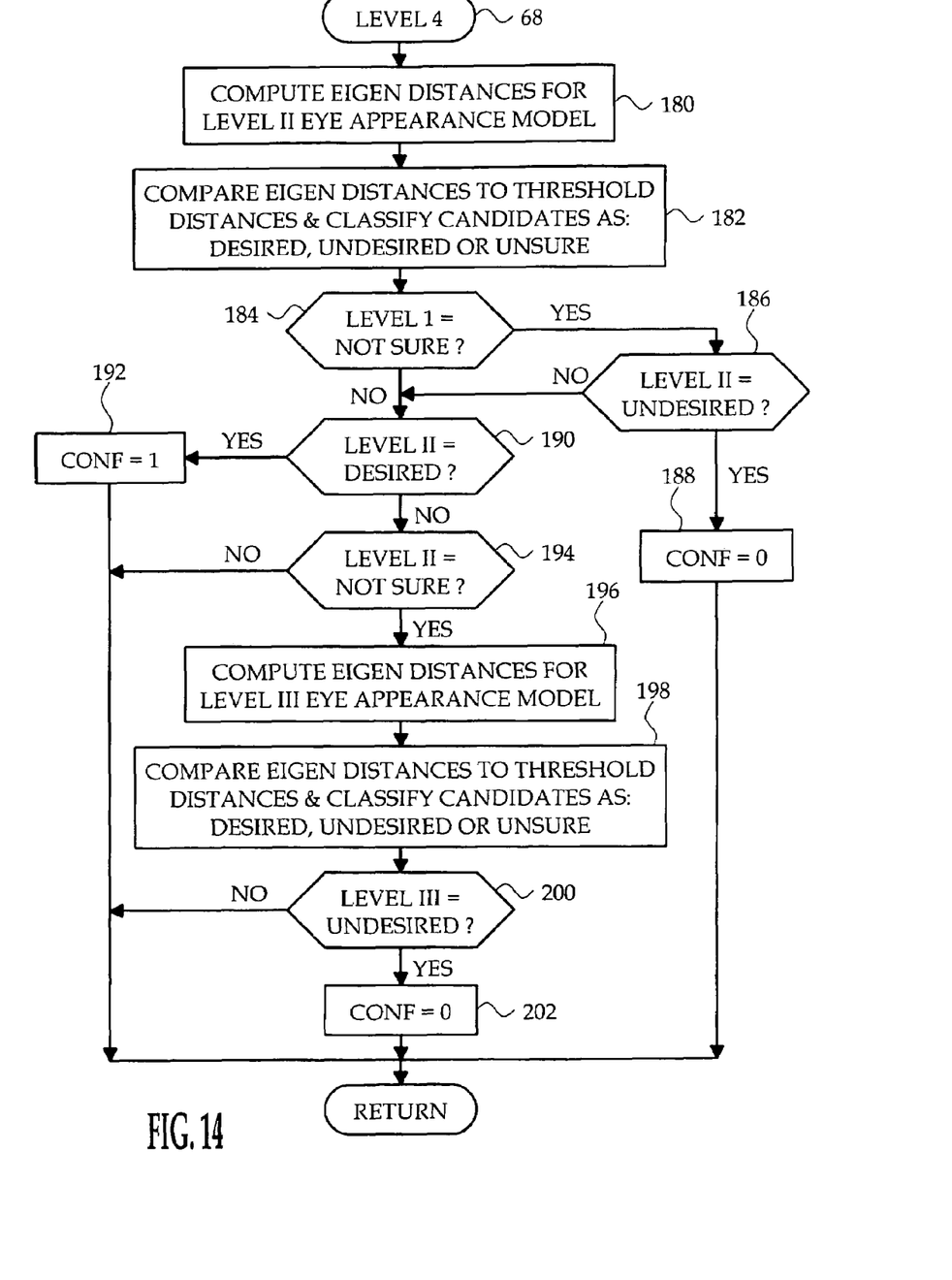
FIG. 14 is a flow diagram detailing a portion of the main flow diagram of FIG. 7 pertaining to multi-resolution appearance-based filtering.

As indicated above, the fourth layer of the eye detection process (i.e., block 68 of FIG. 7) carries out higher resolution appearance-based testing on the winning and runner-up (if any) eye candidates identified in the third processing layer. The block 180 computes Eigen-space distances between the eye candidate and mid-resolution (Level-II) eye and non-eye models, and the block 182 compares the distances to thresholds to classify the eye candidate as DESIRED, UNDESIRED or UNSURE as described above in reference to the low resolution (i.e., Level-I) appearance testing. The blocks 184, 186 and 188 award a confidence level of zero (lowest confidence) to the eye candidate if it has been classified as UNSURE in the Level-I appearance testing and as UNDESIRED in the Level-II appearance testing. The blocks 184, 190 and 192 award a confidence level of one (highest confidence) to the eye candidate if it has been classified as DESIRED in both the Level-I appearance testing and the Level-II appearance testing. Block 194 determines if the eye candidate has been classified as UNSURE in the Level-II appearance testing. If so, the block 196 computes Eigen-space distances between the eye candidate and high-resolution (Level-III) eye and non-eye models, and the block 198 compares the distances to thresholds to classify the eye candidate as DESIRED, UNDESIRED or UNSURE as described. If the eye candidate is classified as UNDESIRED in the Level-III appearance testing, the blocks 200 and 202 award a confidence level of zero to the eye candidate, completing the routine. In any event, the confidence level awarded by this fourth processing layer is stored as a history item for the respective eye candidate.

Figure 15:
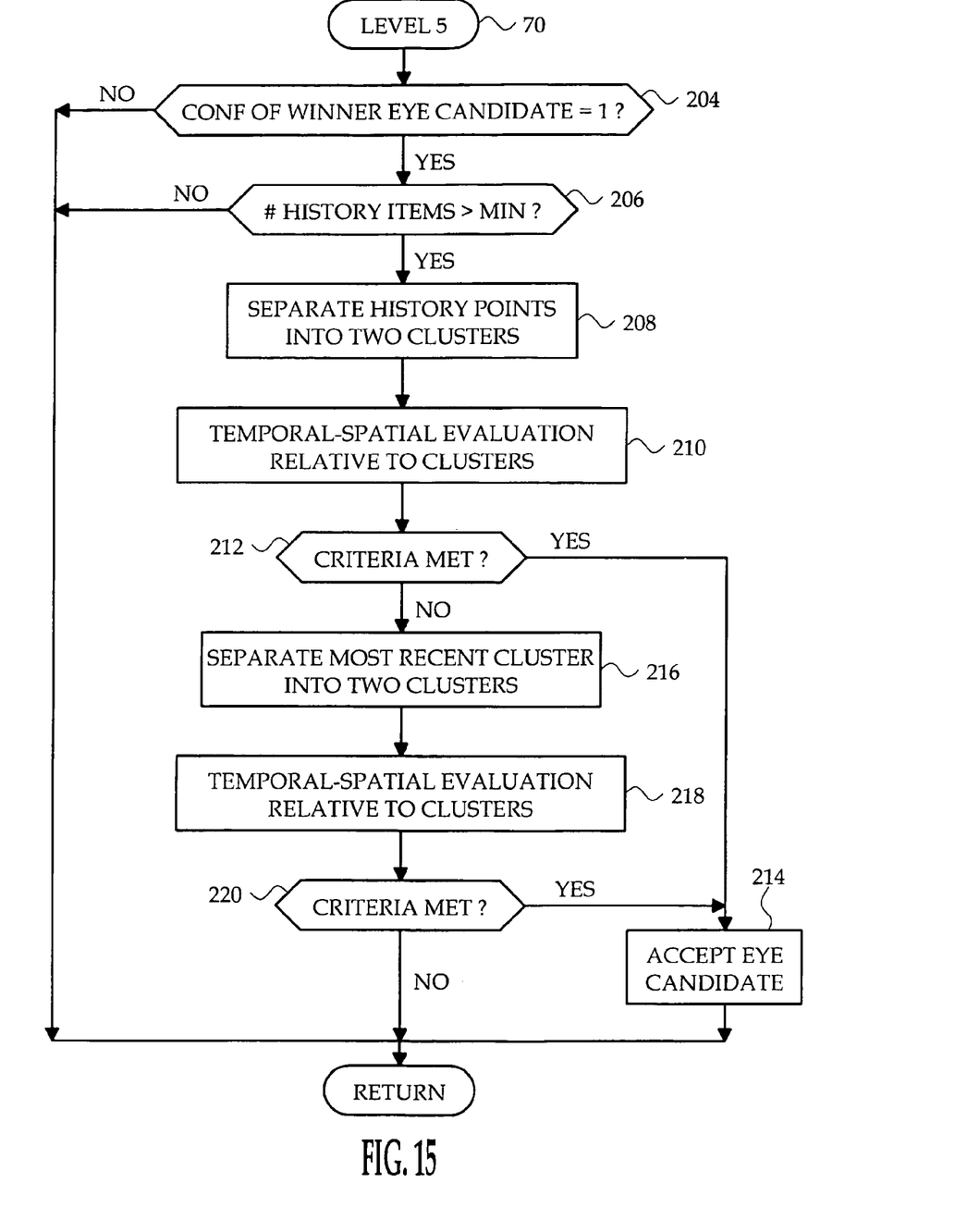
FIG. 15 is a flow diagram detailing a portion of the main flow diagram of FIG. 7 pertaining to application of temporal spatial filtering.

As indicated above, the fifth layer of the eye detection process (i.e., block 70 of FIG. 7) carries out a temporal-spatial evaluation of any eye candidate awarded a confidence level of one (highest confidence) by the fourth processing layer. Referring to the flow diagram of FIG. 15, the block 204 initially determines if such an eye candidate exists. If so, the block 206 determines if number of stored history items is at least a minimum number MIN, such as twenty. If not, the routine is exited. In other words, the temporal-spatial evaluation of FIG. 15 is only carried out after a given number of high confidence eye candidates from successively produced video images have been identified by the first four processing layers. If block 206 is answered in the affirmative, the block 208 separates the stored history points into two clusters, one for each of the occupant's eyes. The block 210 then evaluates the high confidence eye candidate from the current image frame relative to the two clusters—i.e., relative to the locations of immediately prior high confidence eye candidates.

This temporal-spatial evaluation is described below in reference to the flow diagram of FIG. 16. The blocks 212 and 214 designate the eye candidate as ACCEPTED if it passes the temporal-spatial evaluation. Otherwise, the block 216 separates the cluster containing the eye candidate from the current image frame into two additional clusters, and the block 218 evaluates the eye candidate relative to the two new clusters, again using the temporal-spatial evaluation of FIG. 16. And blocks 220 and 214 designate the eye candidate as ACCEPTED if it passes the temporal-spatial evaluation.

Figure 16:
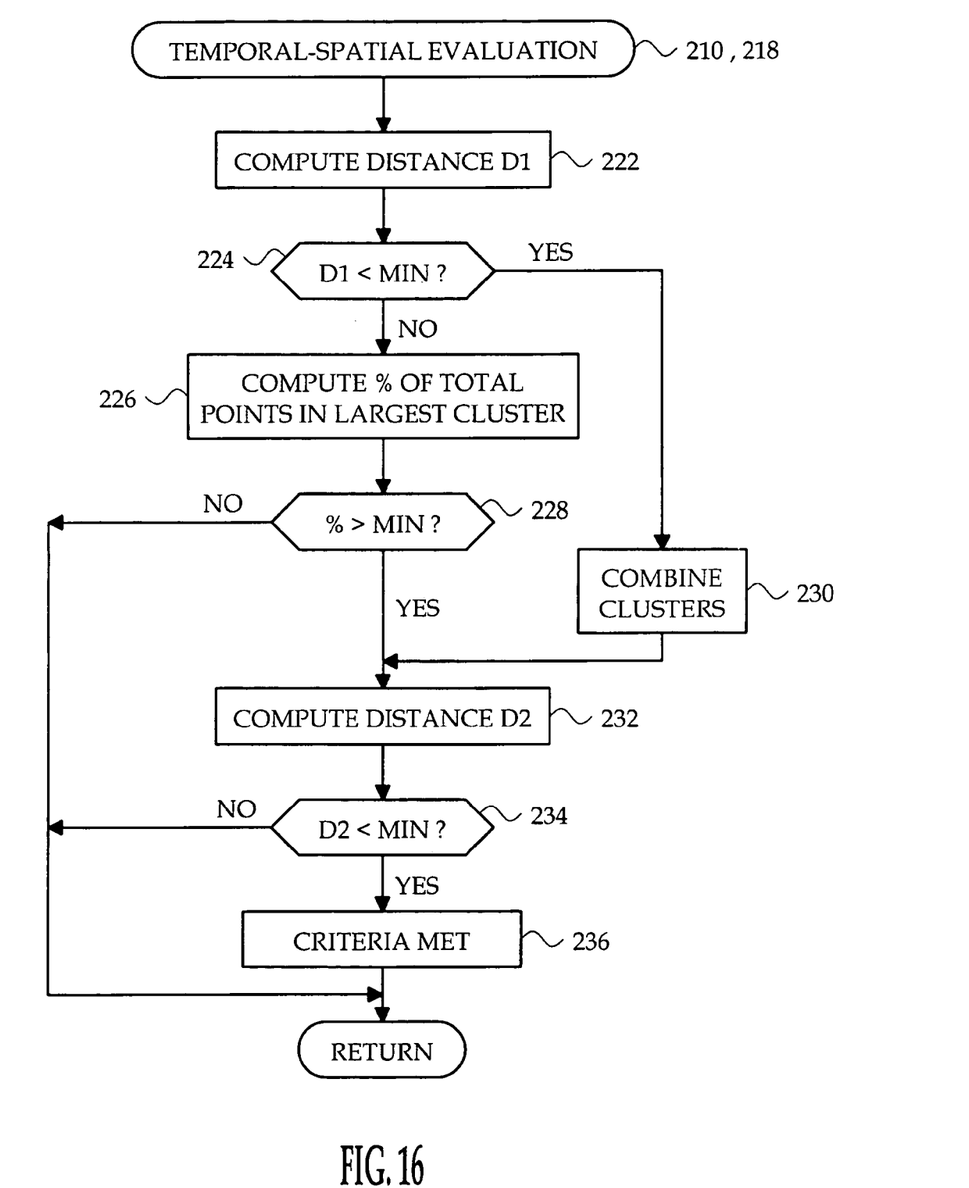
FIG. 16 details a portion of the flow diagram of FIG. 16 pertaining to evaluation of temporal spatial filtering.

As indicated above, the temporal-spatial evaluation routine of FIG. 16 involves comparing the location of a given eye candidate to a plurality of eye candidates that have been separated into two clusters. Referring to FIG. 16, the block 222 is first executed to compute the mean of each cluster and the distance D1 between the two means. Block 224 determines if the distance D1 is less than a calibrated minimum distance MIN. If the distance D1 is greater than MIN, the block 226 selects the cluster comprising the highest number of eye candidates and characterizes the number as a percentage of the total number of stored history points. Block 228 compares the calculated percentage to a minimum percentage MIN such as 60%. If the percentage is less than MIN, the evaluation is inconclusive and the routine is exited; otherwise, the routine proceeds to block 232. If block 224 determines that the distance D1 between the two clusters is less than MIN, the block 230 combines the two clusters into a single cluster, whereafter the routine likewise proceeds to block 232. The block 232 computes the mean of the selected (or single) cluster and the distance D2 between the evaluated eye candidate and the computed mean. The blocks 234 and 236 award a passing grade to the eye candidate if the distance D2 is less than a calibrated minimum distance MIN, completing the routine. If the distance D2 is greater than MIN, there is insufficient correlation between the eye candidate being evaluated and the previously identified eye candidates, and the eye candidate does not pass the evaluation. As a result, the temporal-spatial routine of FIG. 15 only accepts an eye candidate if its location is in agreement with recently identified eye candidates.

In summary, the detection method of the present invention provides an efficient and reliable method of detecting a human eye in a video image. Horizontal and vertical pixel projections of a binarized subset of the image are used to identify potential eye candidates. After clustering the potential eye candidates using rudimentary appearance considerations, winning eye candidates are selected based on appearance, spatial-geometric and anthropomorphic considerations. The winning eye candidates are subjected to additional appearance testing, and high confidence eye candidates are accepted if they favorably compare with identified eye candidates from previous video image frames.

While the present invention has been described with respect to the illustrated embodiment, it is recognized that numerous modifications and variations in addition to those mentioned herein will occur to those skilled in the art. Accordingly, it is intended that the invention not be limited to the disclosed embodiment, but that it have the full scope permitted by the language of the following claims.

The invention claimed is:

1. A method of identifying eye candidates in a video image of a human subject, comprising the steps of:
   (a) identifying a face-blob region of the image that includes all contiguous facial skin of the subject;
   (b) selecting a subset of said face-blob region that is most likely to include the subject's eyes;

(c) projecting horizontal rows of pixels in said subset and selecting a row of maximal receptive hole content;
(d) identifying each black pixel in the selected row as an eye candidate center;
(e) for each identified black pixel, determining a receptive hole count in a vertical column of pixels including the black pixel, and selecting the black pixels for which the determined receptive hole count is less than a predetermined threshold;
(f) forming potential eye candidates for each of the selected black pixels by extracting eye-sized patches of said image centered on the selected black pixels;
(g) appearance testing the potential eye candidates and selecting the potential eye candidates that satisfy an eye appearance criterion;
(h) pairing selected potential eye candidates that are separated by less than a predetermined distance, and of the paired potential eye candidates, retaining a single eye candidate that best satisfies said eye appearance criterion;
(i) testing the retained potential eye candidates based on spatial and anthropomorphic considerations to select one or more winning eye candidates;
(j) accumulating a tabulation of winning eye candidate locations for a series of successively produced video images;
(k) comparing a location of a winning eye candidate from a current video image to said tabulation of said winning eye candidate locations;
(l) accepting the winning eye candidate from the current video image if its location compares favorably to said tabulation of said winning eye candidate locations;
(m) dividing the accumulated tabulation of winning eye candidate locations, including the location of the winning eye candidate from the current video image, into two clusters by their location; and
(n) if the location of the winning eye candidate from the current video image does not compare favorably to the locations of said two clusters, selecting the cluster including the location of the winning eye candidate from the current video image, dividing the selected cluster into two new clusters by their location, and evaluating the winning eye candidate from the current video image based on its location relative to locations of the two new clusters to determine if it should be accepted.

2. The method of claim 1, including the steps of:
selecting horizontal rows of pixels adjacent the selected row; and
repeating steps (d) through (i) for the selected adjacent horizontal rows to select additional eye candidates.

3. The method of claim 1, including the steps of:
determining a first mean distance between the two new clusters; and
if said mean distance is less than a first reference distance:
combining the two new clusters into a single cluster;
computing a second mean distance between the location of the winning eye candidate from the current video image and a location of said single cluster; and
accepting the winning eye candidate from the current video image if said second mean distance is less than a second reference distance.

4. The method of claim 1, including the steps of:
identifying one of said two new clusters comprising at least a predetermined percentage of said tabulation of winning eye candidate locations;
computing a mean distance between the location of the winning eye candidate from the current video image and a location of the identified new cluster; and
accepting the winning eye candidate from the current video image if said mean distance is less than a reference distance.

* * * * *